(12) United States Patent
Stadler et al.

(10) Patent No.: US 7,412,541 B1
(45) Date of Patent: Aug. 12, 2008

(54) TOKENIZED COMPRESSION OF SESSION INITIATION PROTOCOL DATA

(75) Inventors: Andrew D. Stadler, San Francisco, CA (US); Christopher R. Wysocki, Cupertino, CA (US)

(73) Assignee: Core Mobility, Inc., Mountain View, CA (US)

( * ) Notice: Subject to any disclaimer, the term of this patent is extended or adjusted under 35 U.S.C. 154(b) by 931 days.

(21) Appl. No.: 10/622,222

(22) Filed: Jul. 18, 2003

(51) Int. Cl.
*G06F 15/16* (2006.01)
*G06F 15/173* (2006.01)

(52) U.S. Cl. .................. 709/247; 709/227; 379/900
(58) Field of Classification Search ............... 709/227, 709/230, 246–247; 379/900
See application file for complete search history.

(56) References Cited

U.S. PATENT DOCUMENTS

| | | | |
|---|---|---|---|
| 5,855,003 A | 12/1998 | Ladden et al. | |
| 6,707,400 B2 * | 3/2004 | Christofferson et al. | 341/106 |
| 6,807,173 B1 * | 10/2004 | Lee et al. | 370/389 |
| 6,985,965 B2 * | 1/2006 | Hannu et al. | 709/247 |
| 7,010,727 B1 * | 3/2006 | Stucker | 714/52 |
| 7,143,191 B2 * | 11/2006 | Chuah et al. | 709/247 |
| 2002/0046315 A1 | 4/2002 | Miller et al. | |
| 2004/0022237 A1 | 2/2004 | Elliot et al. | |
| 2004/0162032 A1* | 8/2004 | Li et al. | 455/72 |

OTHER PUBLICATIONS

Hannu, H. et al. "SigComp—Extended Operations", <draft-ietf-rohc-sigcomp-extended-03.txt>, Network Working Group Internet Draft, May 3, 2002, 16 pages.*

Price, Richard et al. "Signaling Compression", <draft-ietf-rohc-sigcomp-06.txt>, Network Working Group Internet Draft, May 6, 2002, 58 pages.*

U.S. Appl. No. 11/932,669, filed Oct. 31, 2007, Stadler et al.

WO 2007/070860 A3, International Search Report for International Application PCT/US06/62120, 3 pages.

ITU-T Recommendation V.70 [online]. Telecommunication Standardization Sector of International Telecommunication Union; Dated Aug. 1996; http://www.itu.int/rec/dologin_pub.asp?lang=e&id=T-REC-V.70-199608-I!!PDF-E&type=items; 22 pages.

* cited by examiner

*Primary Examiner*—George C Neurauter, Jr.
(74) *Attorney, Agent, or Firm*—Workman Nydegger

(57) ABSTRACT

Systems and methods are provided for compressing and decompressing session initiation protocol (SIP) messages. A serializer and parser compress and decode SIP data structures according to a tokenized binary protocol. The compression/decompression protocol uses tokens the represent message elements of the internal data structures that define SIP messages. Tokens may be assigned to message elements based on various design requirements. Some tokens provide sufficient generality to encode any legal SIP message, while others are highly optimized to match the elements found in most common SIP messages. For those elements requiring specific strings, three dictionaries are defined. Two of the dictionaries are static and are never transmitted; the third dictionary is dynamic and contains strings found only in the specific message. Because the message dictionary is transmitted with each message, and contributes to the size of the transmitted message, the message element tokens are designed to reduce the size of the message dictionary to the greatest degree possible. The compression of SIP messages in this manner is stateless in that it does not require knowledge of the characteristics of previous messages.

27 Claims, 6 Drawing Sheets

TOKENIZED COMPRESSION OF SESSION INITIATION PROTOCOL DATA

BACKGROUND OF THE INVENTION

1. The Field of the Invention

The present invention relates to systems and methods for compressing and decompressing Session Initiation Protocol (SIP) data structures. More specifically, the present invention relates to tokenized compression and decompression of SIP data structures to improve call setup times, particularly in wireless telephony devices that have relatively low processing speeds.

2. The Relevant Technology

The present invention generally relates to improving the performance of the Session Initiation Protocol, hereinafter referred to as SIP. The Session Initiation Protocol is a standard set forth by the Internet Engineering Task Force (IETF), the body responsible for administering and developing the mechanisms that comprise the Internet, and the details of the SIP protocol can be viewed in IETF Request for Comments 3261 (RFC 3261), which is incorporated herein by reference. SIP is an application-layer signaling protocol that can establish, manage and terminate interactive multimedia sessions over an Internet Protocol (IP) network. A session can be as simple as a two-way telephone call or as complex as a collaborative, multimedia conference season. Sessions include voice, video, chart, interactive games and virtual reality. The primary function of SIP is to help session originators deliver "invitations" to prospective session participants.

SIP originated in 1996 as a component of the "multicast backbone" or "Mbone", an experimental multicast network that worked on top of the public Internet. It was used for distributing multimedia content, including seminars and meetings, and one of its key functions was to invite users to listen in on multimedia sessions on the Internet. In 1999, it was approved as an official standard by the IETF, and because of its fundamental design goals of scalability, extensibility, interoperability and flexibility, it soon rivaled competitive protocol H.232.

The H.323 protocol, while fairly widely adopted, has some significant liabilities, including lengthy call setup times. With H.323, a session is first established, and only then are the features and capabilities for that session negotiated, causing significantly longer call setup times than an average public switched telephone network (PSTN) call. In contrast, SIP uses less bandwidth because the messages to set up and tear down a session are fewer and smaller. For example, with SIP, the session is initiated and the features to be used during the session are negotiated all in one step. Although signaling using SIP is more flexible than its rival, H.323, utilizing SIP for mobile applications is still problematic because of the large size of SIP messages.

SIP was originally designed for high-speed bandwidth links. Thus, SIP messages can be large—from a few hundred bytes to several kilobytes—so its uses large amounts of bandwidth. More importantly, when SIP messages are run over a narrow-band link, such as a radio interface in a mobile telephony network, session initiation latencies become intolerably long. This is perceived by the user of the mobile service as a lengthy call setup time, which creates a poor user experience.

The large size of SIP messages and its resulting demand for bandwidth gave rise to the requirement for a compression mechanism for SIP. The IETF responded with Signaling Compression or "SigComp," which is described in detail in RFC 3486 of the IETP. While SigComp adequately reduces the amount of bandwidth required for the transport of SIP messages, it has a number of significant limitations.

First, SigComp was designed to directly address reduction in bandwidth, and while this generally improves signaling latency, on certain classes of devices it also has negative impacts. In some cases it may even increase signaling latency, thereby actually increasing call setup time. SigComp uses complex compression algorithms to achieve bandwidth reduction, and is well suited for implementations which have significant CPU and power resources. In devices that are battery powered, the computation required to compress and decompress messages will create significant reductions in battery lifetime. In devices with slow CPU's, this computation takes a significant amount of time, and the time required to compress and decompress messages may actually cancel the latency improvements that are achieved by the reduction in message size. Both of these results make SigComp a poor choice for cellular telephones and similar mobile devices.

Second, SigComp is based on a technique known as stateful compression. In this model, each message contains references to data that was transmitted in previous messages. This model achieves high levels of bandwidth reduction, but it makes the system very sensitive to packet loss. If a packet is lost in transit, multiple effects are felt by the system. Besides failing to receive the original packet, the receiver no longer has the information from that packet, and any subsequent packets, even though properly received, must be discarded by the receiver. The receiver sends a signal to the transmitter indicating that synchronization has been lost, and all lost packets must be retransmitted. Thus, in SigComp, the loss of a single message in the network leads to the failure of two or more messages and significantly increased latencies while the transmitter and receiver are being resynchronized. Overall, these behaviors make SigComp a poor choice for networks that exhibit relatively high rates of packet loss.

Third, a key area of focus for wireless operators in Quality of Service (QOS). As part of an overall QOS program, it is important to have the ability to "sniff" or monitor the data traveling over the network. The ability to successfully monitor data on the network requires that the network information gathering device or sniffing device, such as a network analyzer or packet sniffer, maintain its own database for recording network activity and transforming it into actionable data at some later time. Because SigComp uses stateful compression, its use in this environment would require that the sniffing device maintain a database for each handset associated with the network being monitored. While this is possible, if adds a significant amount of complexity and expense to the QOS program at a time when wireless operators need to reduce expenses, simplify infrastructures, and drastically improve customers service. The ability to monitor the network is not only a QOS issue, but it is necessary for system debugging and for initial system qualification as well—all important processes that becomes much more difficult to perform in some environment using SigComp.

Therefore, what is needed is a method for increasing the efficiency of SIP signaling in a mobile IP network without increasing complexity, processing time or sacrificing battery life, such that call setup latencies are significantly reduced, bandwidth is used efficiently, debugging and monitoring are not adversely impacted, and customer satisfaction is improved.

BRIEF SUMMARY OF THE INVENTION

The present invention is directed to systems and methods for compressing and decompressing SIP requests and responses using a tokenized protocol, such that the size of SIP messages is reduced, call setup times are reduced, bandwidth is utilized more efficiently, and CPU and power requirements are reduced. The systems and methods of the present invention use a tokenized byte-oriented protocol. The tokenized SIP data is read and processed serially and closely models data structures of message objects used by typical SIP implementations, making it easy to encode and decode.

The systems of the present invention include control modules that handle aspects of the SIP transaction including, but not limited to, generating SIP messages, receiving SIP messages, and setting up and tearing down data sessions. The control modules are located on the communications devices, such as mobile telephony devices, that represent the originating and terminating devices between which communications are set up using SIP. The systems of the invention also include a tokenized serializer, which converts SIP messages from internal data structures representing the message to a compressed format using a tokenized binary protocol, and a tokenized parser, which receives an incoming compressed SIP message and converts it from tokenized format to internal data structures representing the message. The decompressed SIP message is then sent to a processor in the control module to complete the SIP transaction.

The tokenization scheme is based on the premise that SIP messages are based on groups of common message elements, that each message element can be represented by one token or a small series of tokens, and that fidelity of construction and deconstruction must adhere to SIP's syntactic requirements, instead of strict byte-by-byte reproduction of the messages. Some tokens describe elements themselves, and other tokens indicate strings or other reserved words to be used as part of an element. Certain tokens are reserved to provide highly compact representation of common message elements, while other tokens provide generalized indications that can be used with any message element, as long as it is within the boundaries of legal SIP message construction. Because tokenized SIP employs various tokens to represent common data structures within the SIP message object, strings are required less frequently, the size of the dictionaries is reduced, and the message is transmitted more efficiently.

When the SIP stack intends to transmit a SIP message, it constructs the SIP message as a series of internal data structures representing the semantics of the message. It then passes the structures to a serializer. In tokenized SIP, this serializer performs two tasks. First, it analyzers the message, and constructs a message dictionary, consisting of all substrings used in the message but not appearing in fixed, shared dictionaries. Second, it generates a stream of tokens that describe the structure and content of the SIP message. The combination of message dictionary and message token stream, assembled together, form a tokenized SIP message.

When the SIP stack receives a tokenized SIP message, the message is processed by a tokenized parser. The tokenized parser reads one token byte, processes that byte using token-specific rules or data from fixed, shared dictionaries or the message dictionary, and then returns to read the next token. The output of this process is the data structures used within the SIP stack for further processing of the received SIP message. The process of decoding the tokenized SIP message is tracked as the message moves from setup, through start-line and headers, and finally into the content section.

In a preferred implementation, the tokenized serializer and parser are integrated into the SIP stack. This permits the tokenized serializer to convert the SIP message objects to the message token stream in a single step without an intervening plaintext representation of the SIP message. Similarly, an integrated tokenized parser reconstructs the tokenized SIP message directly into the corresponding SIP data structures. In an alternate implementation, the tokenized serializer and the tokenized parser can be configured separately from a SIP stack. Although this approach requires converting the SIP messages into an intervening plaintext format, the user of separate tokenized serializers and parsers can be useful for adapting existing SIP stacks to tokenized SIP compression schemes.

There are three primary advantages to the present invention. First, the tokenized SIP method achieves acceptable compression ratios that are comparable to other compression methods without incurring the processing overhead or sacrificing battery life as with SigComp. Thus, the tokenized SIP methods of the invention are particularly useful in mobile telephony systems. Second, not only is it faster to run tokenized SIP then it is to run SigComp, it is also faster to run tokenized SIP than native SIP, because tokenized SIP is constructed in such a way as to be easier to parse than native SIP. Third, tokenized SIP is stateless, so there is no database in which characteristics of previous messages are stored, and the compression and decompression is performed without requiring knowledge of previous messages. Therefore, in a packet loss situation, the tokenized SIP compression methods of the invention significantly outperform SigComp. The tokenized SIP compression methods also allow wireless operators to pursue their QOS goals with far less expense and complexity.

These and other objects and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

The present invention is directed to compressing data structures related to the Session Initiation Protocol (SIP)

developed by the IETP. The SIP protocol enables a communication device to initiate or negotiate a media session, such as an Internet conference, an event notification, a telephone call, a presence update, or an instant message with a remote device. SIP is a transactional protocol in that interactions between components take place in a series of independent message exchanges. Each SIP transaction consists of a request and a response. SIP is based on an HTTP-like request/response transaction model. Each transaction includes a request that invokes a particular method, or function, on the server and at least one response. As used herein, the term "message" or "SIP message" refers to any request or response using SIP protocol.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise physical storage media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer.

When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions. Data structures include, for example, data frames, data packets, or other defined or formatted sets of data having fields that contain information that facilitates the performance of useful methods and operations. Computer-executable instructions and data structures can be stored or transmitted on computer-readable media, including the examples presented above.

1. Exemplary Operating Environment

Figure 1:
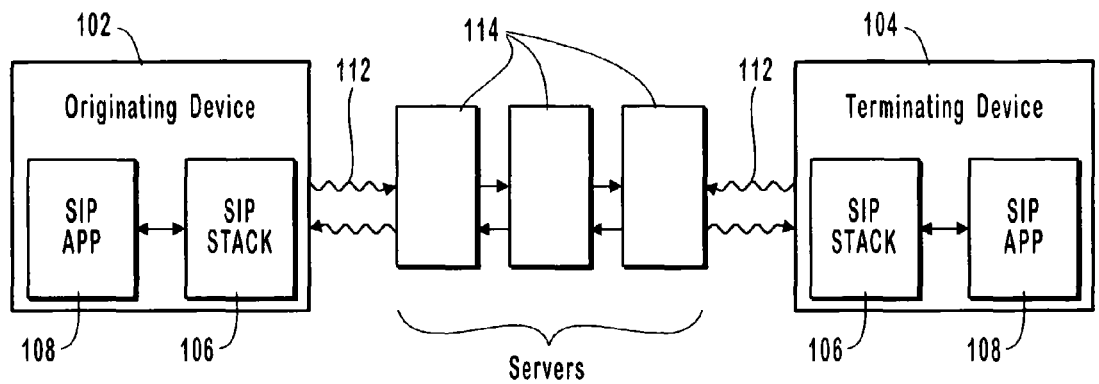
FIG. 1 illustrates an exemplary environment illustrating transmission of a SIP message between two communication devices.

FIG. 1 shows an exemplary system 100 for a SIP message exchange between an originating device 102 and a terminating device 104 in the context of a wireless network. The originating device 102 and the terminating device 104 are communication devices, such as wireless stations, that engage in a communication session that it set up using SIP. Each communication device 102 and 104 includes a SIP stack 106 and a SIP application 108, such as a telephony application, that generates or otherwise makes use of SIP messages to initiate or negotiate communication sessions. The SIP stacks 106, when used for processing outgoing SIP messages, interface with the SIP application 108, process and tokenize the SIP data structures according to the methods disclosed herein, and interface with the physical communication medium. The SIP protocol stack 106 performs the converse operations for incoming SIP data.

One characteristic of wireless networks, such as mobile telephone networks, is that the communication devices 102 and 104 communicate with servers 114 using radio signals, which is a low bandwidth medium 112. As described herein, SIP messages that are not compressed often result in relatively long call setup times, and the use of SigComp with its high CPU requirements often does not improve call setup times and uses significant battery power. While the network illustrated in FIG. 1 is a wireless network, such as a mobile telephone network, SIP is used in other operating environments, and the invention can be implemented in any such operating environment.

A particular communication device 102 or 104 that engages to SIP message exchanges can typically operate as an originating device or a terminating device as needed. The term "user" refers to a person who operates, interfaces with, or has possession of a communication device. In order to initiate a communication session, originating device 102 generates a SIP message, such as an INVITE request, that is compressed using the techniques disclosed herein. The compressed SIP message is then sent over the communication medium 112 to servers 114 and then to the terminating device 104.

2. SIP Messages and SigComp Compression

Figure 2A:
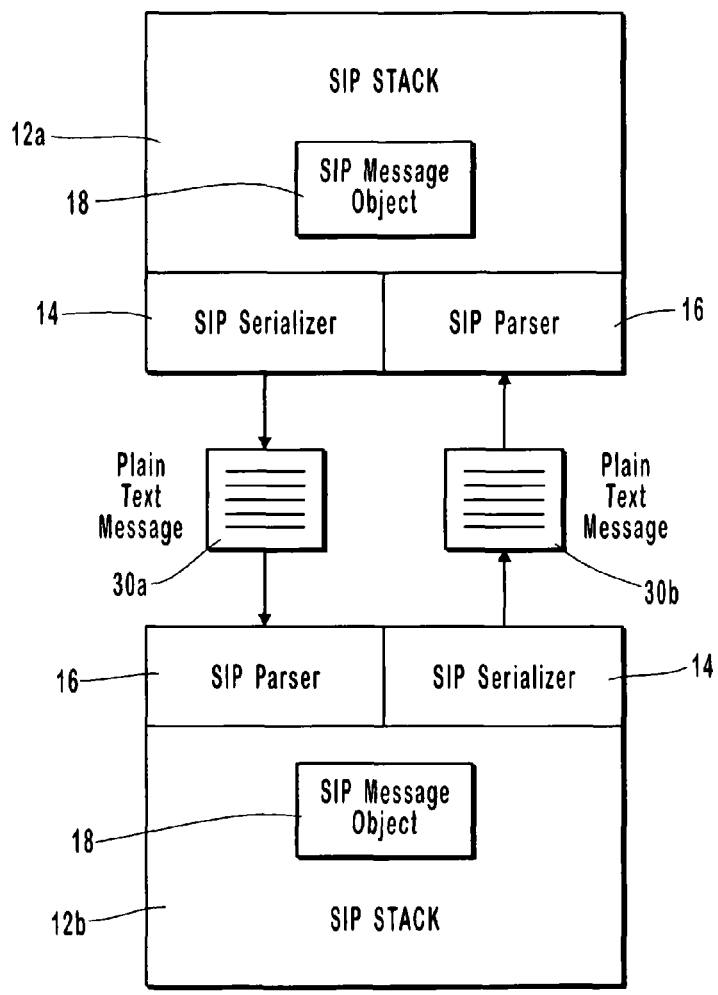
FIG. 2A illustrates SIP stacks used in communication devices.

FIG. 2A illustrates a pair of conventional SIP stacks 12a and 12b that reside in respective communication devices. Each SIP stack 12a and 12b includes a SIP serializer 14 and a SIP parser 16. The SIP serializer 14 converts the SIP messages object 18 to a plaintext message 30a that includes the content of the SIP message object. The plaintext message 30a is received by the SIP parser 16 of the SIP stack 12b of the terminating device. The SIP parser reconstructs SIP message object 18 from the plaintext message 30a. The terminating device can also use its SIP stack 12b to send a plaintext message 30b with SIP content to the SIP stack 12a of the other communication device. In this case, the plaintext messages 30a and 30b are not compressed and can use relatively large amounts of bandwidth, particularly in low bandwidth networks, such as mobile telephone or other wireless networks.

Figure 2B:
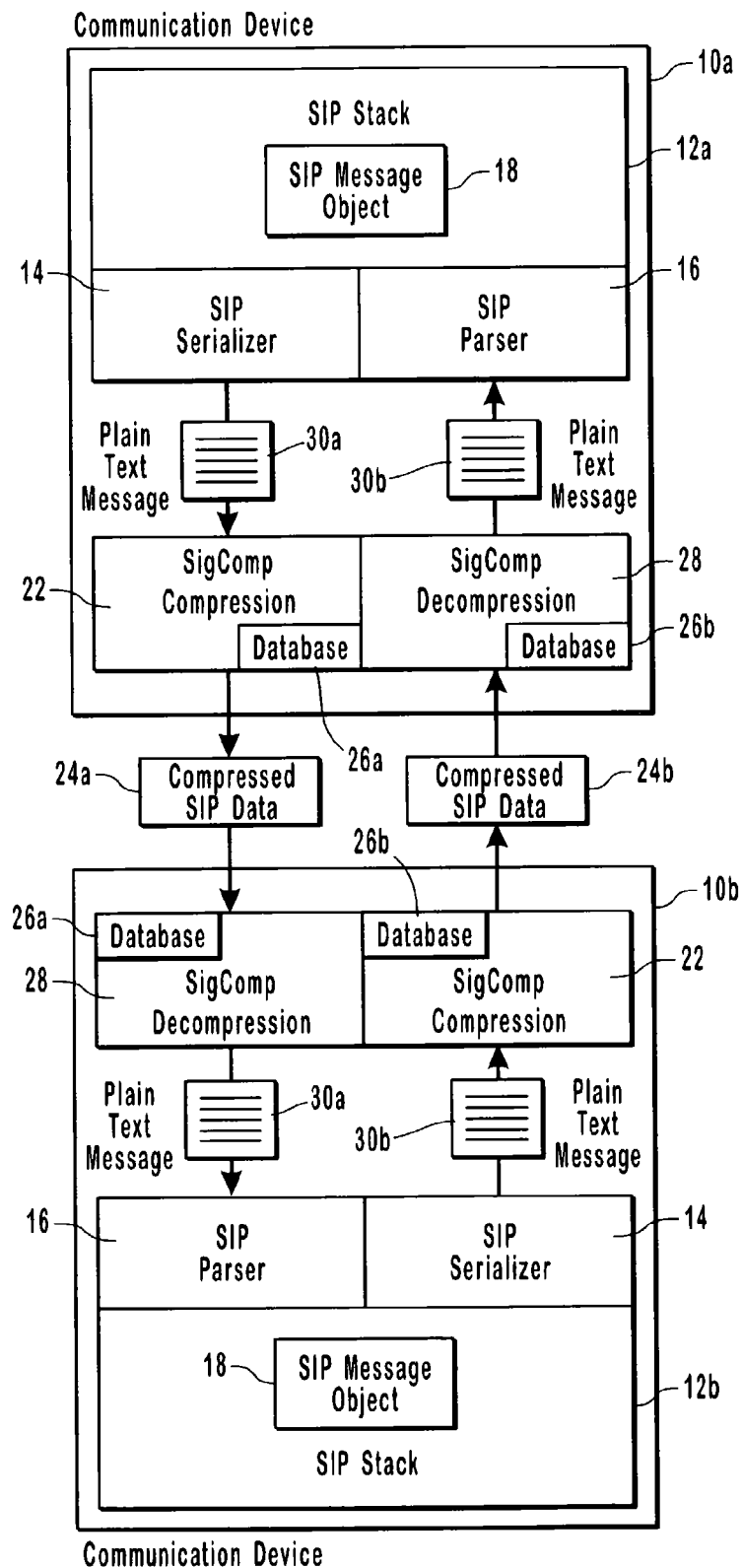
FIG. 2B illustrates SIP stacks that use the Signal Compression protocol for compressing and decompressing SIP messages.

For purpose of illustrating differences between the present invention and SigComp, FIG. 2B depicts a communication device 10a and a communication device 10b configured to use the SigComp compression/decompression protocol. In general, communication device 10a and 10b have similar components, and the numbering of these components in FIG. 2B is identical. However, communication devices 10a and 10b can be different and have different components and features so long as both are adapted for use with the compression techniques of SigComp. As illustrated therein, communication device 10a includes a SIP stack 12a that is essentially identical to that of SIP stack 12a of FIG. 2A. The SIP serializer 14 converts the SIP message object 18, which includes the data structures of the SIP message as generated by the SIP application of device 10a, to a plaintext message 30a, as has been described above in reference to FIG. 2A.

The conventional SIP stack 12a is supplemented with a SigComp compression module 22 that performs stateful compression on the resulting plaintext version of the SIP message to generate compressed SIP data 24a. As previously noted, the SigComp compression is performed by generating messages that may contain references to data that was transmitted in previous messages. As part of this process, SigComp compression module 22 of communication device 10a maintains a database 26a that contains information that characterizes the previous messages. The corresponding SigComp decompression module 28 of the terminating device 10b maintains the same database 26a, so long as data packets are not lost. This is a weak link of SigComp in wireless networks in which data packet loss is common.

Assuming that the databases 26a of the originating and terminating devices are synchronized SigComp decompression module 28 of the terminating device decompresses the compressed SIP data to reconstruct a plaintext messages 30a. The plaintext message 30a is parsed by SIP parser 16, resulting in a copy of the SIP message object 18 expressed in the internal SIP data structures at the terminating device 10b. At this point, the SIP message is ready to be used for operations such as call setup, call teardown, or event notification. As noted previously, each communication device 10a and 10b has both compression and decompression capabilities, and SIP messages can be sent from device 10b to device 10a in a similar manner, using the SIP serializer 14, SigComp compression module 22, SigComp decompression module 28 and the synchronized databases 26b, and SIP parser 16.

From the standpoint of the compression engine of Sig-Comp compression module 22, the data that is compressed is simply a text message. Moreover the compression engine of the SigComp compression module 22 operates without regard to the underlying content or meaning of the SIP data structures. In other words, the fact that the plaintext message 30a output from SIP serializer 14 has an underlying SIP meaning is essentially irrelevant to the compression engine of compression module 22. Similarly, the decompression engine of SigComp decompression module 28 performs decompression without regard to the underlying SIP meaning of the compressed data.

The SigComp method and setup exhibits many disadvantages, which have been identified above. The present invention eliminates the separate nature of the binary-to-text encoding step and compression step of SigComp and provides a single encoding and compression step in which internal data structures are converted directly to tokenized binary format. In addition, the conversion from structures to tokens is not based on text analysis, but instead based on the semantics of the message and the characteristics of the SIP protocol. Moreover, the encoding and decoding methods of the invention are stateless, meaning that they can be performed without relying on information specifying characteristics of previous messages.

The compression and decompression methods of the invention can be readily adapted to the content that may be included in a particular SIP message, as will be described in greater detail hereinbelow. The following paragraphs present a specific example of a SIP message object, or data structure, that can be used to initiate or set up a communication session between originating device 102 and terminating device 104. It is to be understood that the specific example of the following paragraphs, as well as the specific examples of dictionaries and other data structures disclosed hereinbelow, are presented to illustrate the invention and are not intended to be limiting of its scope. Those of skill in the art, upon learning of the invention, will understand how to implement the compression and decompression methods of the invention in ways other than the specific examples that follow.

The following example is provided to illustrate a typical SIP message, or data structure. Originating device 102 "calls" terminating device 104 using a SIP identity, a type of Uniform Resource Identifier (URI) called a SIP URI, which is similar inform to an email address. Alternatively, the SIP identity can be a phone number. In this example, terminating device 104's identity is tel:6505557000. Originating device 102 has a SIP URI of originator@example.com.

In this example, the transaction begins with originating device 102 sending an invite request addressed to terminating device 104's SIP URI. "Invite" is an example of a SIP method that specifies the action that the originating device 102 wants terminating device 104 to take. The invite request contains a number of header fields. Header fields are named attributes that provide additional information about a message. Those present in an invite include a unique identifier for the call, the destination address of initiating device 102, and information about the type of session that originating device 102 wishes to establish with terminating device 104.

In this example, originating device 102 first sends an invite request to terminating device 104. The invite request can look like this:

INVITE tel:6505557000 SIP/2.0
Via: SIP/2.0/UDP
   10.0.0.99;branch=z9hG4bKYwAACk7wKjc4;tok="1/com.example/1"
To: Terminating device <tel:6505557000>
From: Originating device
   <sip:originator@example.com>;tag=3819CF51
CSeq: 4255293 INVITE
Call-ID: 0059216C@10.0.0.99
Contact: <sip:originator@example.com>
Content-Type: application/sdp
Proxy-Authorization: digest
username="originator@example.com",
   realm="example.com",
   nonce="ZeqIIk3FpPbz0If68UYDa+A==_57541d2",
   uri="tel:6505557000",
   response="77f7bb755bla73e9b3ac7e21d8d77baa"

The first line of the text encoded message contains the method name, i.e. invite. The lines that follow are a list of header fields. The header fields are briefly described below.

"Via" contains the address at which originating device 102 is expecting to receive responses to this request. It also contains a branch parameter that identifies this transaction.

"To" contains, optionally, a display name (e.g., Terminating device) and a SIP identity (<tcl:6505557000>) toward which the request was originally directed. In this example, the SIP identity is a telephone number. In general, the SIP elements can include telephone numbers, IP addresses, e-mail addresses, or other unique identifiers, which can correspond to messages strings, binary structures, or other data structures.

"From" also contains, optionally, a display name (e.g., Originating device) and a SIP URI (sip:originator@example.com) that indicates the originator of the request. This header field also has a tag parameter containing a random string (3819CF51) that was added to the URI by the originating device 102 and is used for identification purposes.

"CSeq or Command Sequence" contains an integer and a method name. The CSeq number is incremented for each new request within a dialog and is a traditional sequence number.

"Call-ID" contains a globally unique identifier for this call, generated by the combination of a random string and the host name of originating device 102 host name or IP address. The combination of the "To" tag, "From" tag, and "Call-ID" completely defines a peer-to-peer SIP relationship between originating device 102 and terminating device 104 and is referred to as a dialog.

"Contact" contains a SIP URI that represents a direct route to contact originating device 102, usually composed of a device name at a fully qualified domain name. IP addresses are also permitted. While the "Via" header field tells other elements where to send the response, the "Contact" header field tells other elements where to send future requests.

"Content-Type" contains a description of the message body (not shown).

"Proxy-authorization" allows the client to identify itself (or its user) to a proxy that requires authentication.

Note that this is not an exhaustive list of methods or headers that may be used in a SIP transaction.

Originating device 102 sends the invite request to a server, which has the domain example.com. Before forwarding the request, server 114 adds an additional "Via" header field value that contains its own address. The server receives the invite and adds another. "Via" header field value with its own address to the invite and proxies it to receiving device 104. It will be appreciated that receiving device 104 may make a corresponding response upon receiving the invite request.

3. Tokenized SIP

Figure 3:
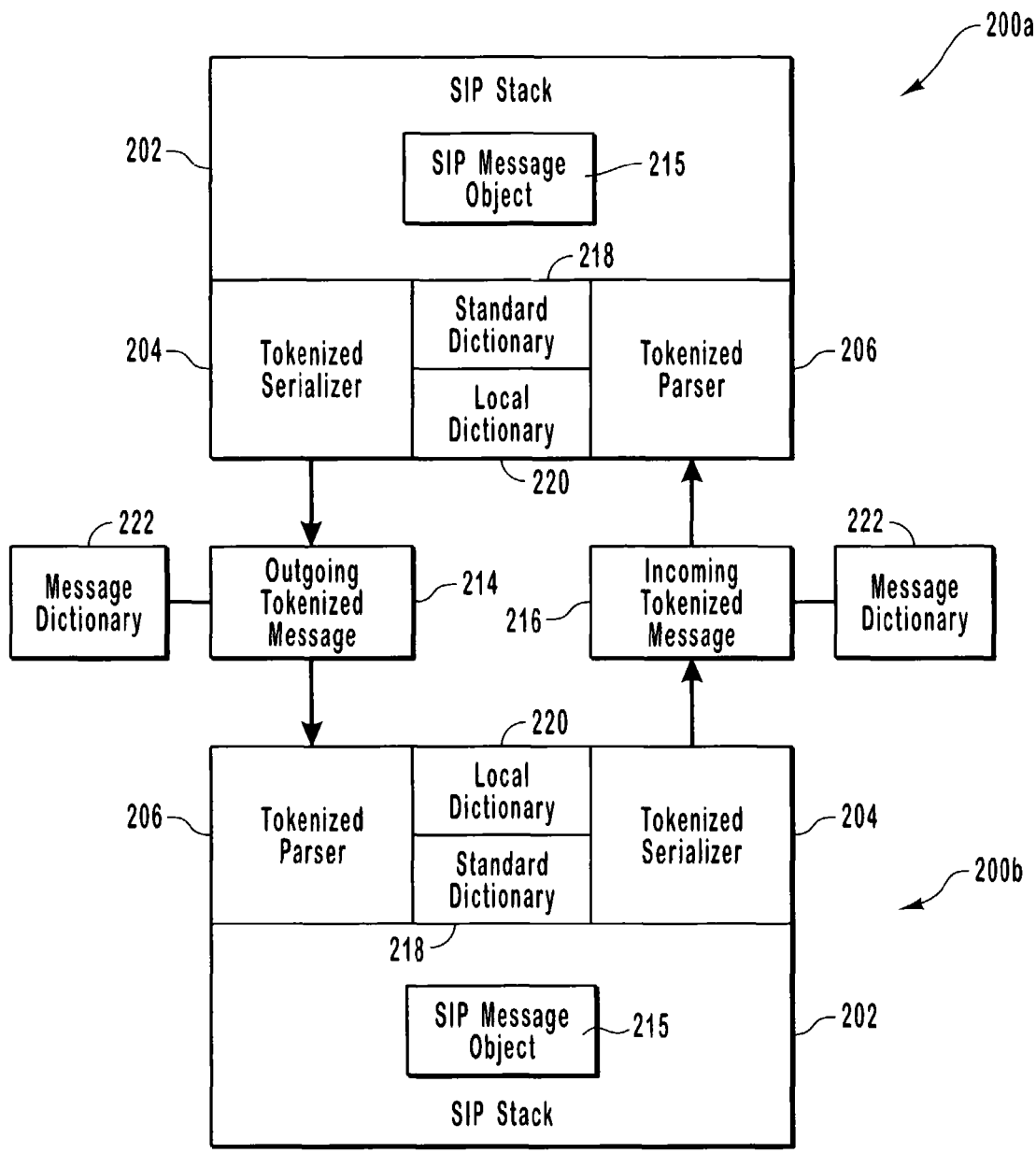
FIG. 3 illustrates an exemplary SIP stack, illustrating components used for compressing and decompressing SIP message using a tokenized protocol.

FIG. 3 illustrates a pair of SIP protocol stacks 200a, 200b that incorporate features of the present invention. The SIP protocol stacks 200a, 200b are implemented in a pair of communication devices to enable the communication devices to initiate a communication session using a SIP message exchange. The pair of stacks 200a, 200b represents the embodiment of SIP protocol stacks 106 that may be found on originating device 102 and terminating device 104 of FIG. 1. Generally, SIP protocol stacks 200a, 200b have similar components, and the numbering of these components in FIG. 3 is identical. However, SIP stacks 200a, 200b can be different and have different components and features so long as both are adapted for use with the compression techniques of the present invention. SIP stack 200a includes a tokenized serializer 204 and a tokenized parser 206.

Figure 4:
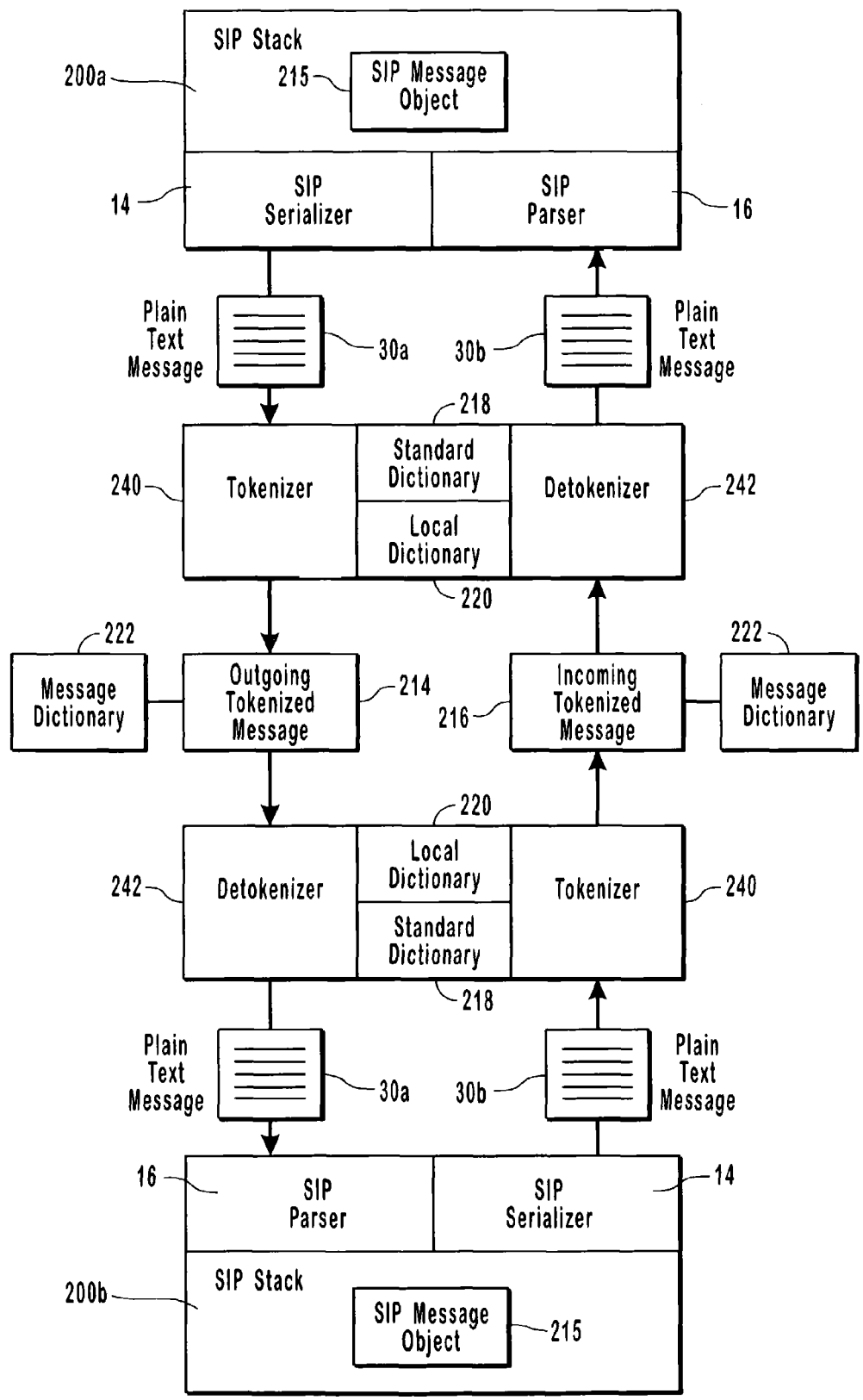
FIG. 4 illustrates an alternative embodiment of the SIP stack of FIG. 3.

In a preferred embodiment, tokenized serializer 204 and tokenized parser 206 are implemented as an integral part of SIP stack 200, which enables the conversion between the internal data structures of the SIP message and the tokenized format (and vice versa) to be performed in a single step. In an alternative embodiment illustrated in FIG. 4, which can be used in situations where an existing SIP stack is adapted to the compression methods of the invention, the tokenizers and detokenizers are separate components that operate in conjunction with a conventional SIP stack. In the embodiment of FIG. 4, the tokenizer 240 and detokenizer 242 do not perform a single step to convert between tokenized SIP data and message elements of the internal SIP data structures. Instead, tokenizer 240 obtains a SIP message in a plaintext format and performs tokenization. Similarly, detokenizer 242 performs detokenization to generate plaintext formatted data. This embodiment is useful when the code of the conventional SIP stack is not accessible to the developer.

Referring back to FIG. 3, SIP stack 200a interfaces with a SIP application, such as a telephony or communication application, that is to use the communication session established by the SIP message exchange. After the SIP application generates the data structures that represent a SIP message, represented by message object 215, the message is sent to tokenized serializer 204. Tokenized serializer 204 converts message object 215 into a binary data packet using a tokenized mapping protocol. That is, each message element in message object 215 is represented by a token. As used herein, the term "token" refers to an 8-bit byte, which is used to represent a particular message element. The binary sequence may be processed at the level of nibbles (4 bits), bytes (8 bits), words (16 bits), etc., depending on the processing capabilities of the initiating device. For those communication devices that do not use binary computer language, tokenizing can be configured for any object code.

Token mapping is an ideal method of handling SIP compression for a number of reasons. First, because many of the same strings are used throughout the various SIP transactions that originating device 102 performs, various dictionaries that contain SIP strings and their corresponding tokens can be used. Thus, the mapping of the strings to token consists of a simple look-up function for most strings.

Second, SIP messages with identical semantic meanings and identical internal representations may be transmitted or received using different text forms. For example, the To header can be transmitted in various forms, such as "To:", "to:", Tokenized SIP uses a single encoding to represent any To: header, while SigComp generates different compression results depending on the precise characters used. In general, this makes tokenized SIP more efficient.

Third, some data structures have fixed format sections that follow a logical order. Thus, mapping of tokens is simplified for these sections because subsequent mapping decisions are based on previous mapping decisions. SigComp would require that the entire section be read and compressed, without any decision making to simplify compression. In other words, because SigComp is text-based, it has no way of identifying particular data structures and making compression choices that are based on those structures. Token mapping provides a more efficient way of compressing and converting the text-based data to binary format.

Token mapping also provides for more efficient decoding of incoming tokenized messages 216 sent from terminating device 104. For incoming tokenized message 216, tokenized parser 206 receives the tokenized message. Tokenized parser 206 decodes tokenized message 216 from tokenized form directly into the internal data structures that will be used by the SIP stack for further processing. Parsing a tokenized message involves the use of dictionaries 218, 220 and 222, as described below, to reconstruct the message elements that form the SIP message object.

Many of the text strings found in a SIP message can be looked up in one or more dictionaries associated with SIP stack 200. Because certain text strings may be common to each SIP message, a standard dictionary 218 is provided in each SIP stack 200. The standard dictionary can be assembled by identifying SIP text strings that are common to any SIP implementation. Tokenized serializer 204 and tokenized parser 206 communicate the standard dictionary 218. Standard dictionary 218 is held in memory with the software that performs the tokenization and is stationary. Table 1 illustrates a portion of a standard dictionary with examples of various text strings. The column labeled "Entry" provides a sequential numbering of the strings found in standard dictionary 218. The column labeled "String" lists the text string which is found in the text-based SIP message.

TABLE 1

| Standard Dictionary Entries | |
|---|---|
| Entry | String |
| 0 | Tok |
| 1 | tok-redir |
| 2 | Sip |
| 3 | SIP |
| 4 | SIP/2.0 |
| 5 | SIP/2.0/TCP |
| 6 | SIP/2.0/UDP |
| 7 | application/sdp |
| 8 | text/plain |
| 9 | Lr |
| 10 | RTP/AVP |
| ... | |
| n | |

Each communication device 102 and 104 can include a standard dictionary 218 having similar strings. Alternatively, standard dictionary 218 on each device 102 and 104 may have different strings. This may be the case when one device has a new version of the standard dictionary, while another device has an older version. Similarly, each communication device 102 and 104 can have local dictionaries 220 having similar strings or may have different versions of the local dictionary.

In one embodiment, the tokenized protocol is based on a byte data structure (two hexadecimal digits). Thus, 256 dictionary entries are possible in any one standard dictionary 218. Because there are so many common strings used in SIP messages, it is possible for multiple standard dictionaries 218 (or other dictionaries) to be necessary. Thus, one or more standard dictionaries 218 may be located in each SIP protocol stack 200.

Tokenized serializer 204 and tokenized parser 206 also communicate with a local dictionary 220 located in SIP protocol stack 200. Local dictionary 220 is held in memory with the tokenization software and is static. Local dictionary 220 contains additional text strings which are specific to that particular domain. Local dictionary 220 contains strings that are commonly found in messages sent or received to a particular terminating device 104, but not found in standard dictionary 218. Table 2 illustrates an example of local dictionary strings. The columns are labeled similar to Table 1.

TABLE 2

Local Dictionary Entries

| Entry | String |
|---|---|
| 0 | 1/com.example/1 |
| 1 | example.com |
| 2 | voice.example.com |
| ... | ... |
| n | |

Standard dictionary 218 and local dictionary 220 can be separate data structures or may be combined in one or more general dictionaries for each SIP stack 200.

In addition, a message dictionary 222 is generated for and delivered with each outgoing tokenized message 214. Message dictionary 222 contains strings specific to that particular message. Thus, the content of message dictionary 222 may vary for each SIP message. Only message dictionary 222 is transmitted between devices 102, 104, with standard and local dictionaries 218, 220 remaining static on each device. Message dictionary 222 is sent as the first item in each tokenized message. Message dictionary 222 is preceded by a length indicator, which is, for example, a 16-bit integer describing the total length of the array plus the strings. The length indicator tells tokenized parser 206 the number of bytes to skip forward to find the first token of the tokenized message. Table 3 illustrates an example of a message dictionary.

TABLE 3

Message Dictionary Entries

| Entry | String |
|---|---|
| 0 | 6505557000 |
| 1 | 10.00.99 |
| 2 | YwAACk7wKjc4 |
| 3 | 3819CF51 |
| 4 | ZeqHk3FpPbz0If68UYDa+A==__57541d2 |
| 5 | __57541d2 |

The message dictionary 222 includes all of the strings that appear in the message but do not appear in either of the static dictionaries 218 or 220. It will be appreciated that message dictionary 222 is much smaller than standard dictionary 218 and/or local dictionary 220, since it is not necessary to include each string of standard dictionary 218 and/or local dictionary 220 in message dictionary 222. In addition, the encoding methods embodied in the tokens are designed to support maximum reuse of strings, keeping each message dictionary as small as possible.

The structure of the tokenized message 214 generally follows a fixed format including a message dictionary 222 (preceded by the length indicator), a start line, headers, and then content. Tokens are grouped so that each section can be readily identified based on the type of token. Hexadecimal notation can facilitate the grouping of tokens. As shown in Table 4, groups of tokens X0-YG (X, Y=0 . . . 8 and/or A . . . F) are used for particular strings. For example, the binary sequences represented by C0 . . DF are set aside for direct access to most-commonly-used text strings located in standard dictionary 218.

TABLE 4

Example of Token Grouping

| Token | Description |
|---|---|
| 00 . . . 0F | Standard dictionary strings, local strings, message strings, header starts, etc. |
| 10 . . . 1F | Name-Addr or URI (including 4 option bits) |
| 20 . . . 3F | single ASCII char (e.g. 0x20 = space) |
| 40 . . . 4F | Parameter |
| 50 . . . 5F | Reserved |
| 60 . . . 7F | fixed-format headers & content |
| 80 . . . 9F | Message dictionary strings, direct access, 0 . . . 31 |
| A0 . . . BF | local dictionary strings, direct access, 0 . . . 31 |
| C0 . . . DF | Standard dictionary strings, direct access, 0 . . . 31 |
| E0 . . . FF | commonly-used header starts, 0 . . . 31 |

It will be appreciated that the above grouping of tokens is exemplary of one embodiment of the present invention. Grouping of tokens may vary depending on the data structure of the tokens and other design parameters. Furthermore, the assignment of a particular token to represent a message element in a SIP data structure that is being compressed may be conducted accordingly in various ways.

In one embodiment, assigning tokens to dictionary entries includes two major methods. The first method is an indexed method. Each dictionary (standard, local and message) is defined by a token, referred to herein as a dictionary token. When a message element can be described by a particular string, a dictionary token will be generated. The dictionary token is followed by a single byte which contains the dictionary entry number for, or location of, the string corresponding to the particular message token. Different tokens exist to identify standard, local, and message dictionaries. If there are more then 256 entries in a given dictionary—the number that can be indexed by a single byte—additional indexed tokens can be defined, effectively splitting that dictionary into multiple sub-dictionaries of 256 or fewer entries each.

The second method is a direct access method, which is an optimization for the most commonly used strings. A block of tokens (e.g., 32) is set aside for single-byte access to a subset of the strings in each dictionary. For example, in Table 1 illustrating standard dictionary 218, the first 32 entries are accessible via direct-access tokens, while the remaining entries are only accessible via index access tokens.

The example illustrated in Table 5 shows both the indexed access and direct access methods for a message dictionary. For this example, assume that the dictionary token for message dictionary 222 is "04" and the direct access tokens to message dictionary 222 are "80 . . . 9F" (for entries 1 to 31). The column labeled "Message String #" shows the message token that is found in the tokenized message. The column labeled "Indexed Access" shows the dictionary token and entry number based on indexed access method. The dictionary token "04" explicitly tells tokenized parser 206 to refer to message dictionary 222 to locate the corresponding message string found at the indicated entry number. The column labeled "Direct Access" shows the direct access token which implicitly indicates to tokenized parser 206 to map the message tokens in the "Message String" column with text strings found in message dictionary 222.

TABLE 5

Indexed Access v. Direct Access

| Message String # | Indexed Access | Direct Access |
|---|---|---|
| 5 | 04 05 | 85 |
| 15 | 04 0F | 8F |
| 35 | 04 23 | n/a |
| 55 | 04 37 | n/a |

With respect to the first message token "5", using the indexed method, the tokenized parser 206 refers to message dictionary 222 as indicated by dictionary token "04" and locate entry number "05" to find the string corresponding to the message token "5". Using the direct access method, the direct access token "85" refers implicitly to message dictionary 222 and entry number "05."

When the standard dictionaries on the two devices engaged in SIP message exchange are different, such as when the standard dictionaries have different versions, versioning strings inserted in the SIP message enable this situation to be resolved. An example of versioning strings used in the SIP messages presented herein is "tok=1/com.example/1". The versioning strings are used to advertise the existence of (a) tokenization capability and (b) the particular set of tokens and dictionaries on that device. Devices do not seen tokenized packets, but instead send only plaintext SIP, until they receive a concrete indication (such as a tok=string) that the recipient can handle tokenized and the versions match.

Other ranges of tokens are used to indicate structural portions of SIP messages, such as the start-line, messages-headers, and message-body. In one embodiment, there are four discrete indications of the start of each header. These are listed in order of desirability (most compact least compact).

The most compact form of a header is the appearance of any fixed-format-header token. These tokens indicate specific formats and specific layouts, and are only used when the header fits in both name and content.

The next is any of the header direct access tokens, E0..FF, 32 commonly used headers are set aside and indicated via these tokens. Any of these tokens will be followed by a free-form description of the remainder of that header (strings, URIs, parameters, etc).

The next is any appearance of the token "10". This token indicates the beginning of a known token, followed by a single byte code for the token, followed by a free-form description of the header data.

The final indication of a header start is token "11", which is used for any unknown token. This token is immediately followed by a string token, generally a local or message string, and then by a free-form description of the header data.

For fixed-format sections, the token assignment protocol takes advantage of the structure-based nature of SIP messages. Certain headers are so common, or have such common layouts, that a more complex assignment protocol still results in more efficient compression. A generic encoding of these headers would require a description of each and every element, while a fixed-format encoding can enforce certain rules and reduce the number of bytes required to encode the header. For example, every properly constructed SIP message contains one or more Via: headers, which are used to assist in routing messages through groups of servers. Each Via: Header consists of a protocol indicator, a "sent-by" string, and one or more parameters such as "branch=" and "tok=". While a generic encoding can be used, the common nature of most Via: headers enables a "fixed format" Via token to be defined. This token is followed by a string (the sent-by), another string (the branch=parameter), and another string (the tok=parameter). No direct indication is provided as to the nature of each parameter string—the fixed-formed token provides the context for each of these strings. With this fixed-format encoding, an entire Via: header can be encoded in as few as four bytes (plus dictionary strings), providing a significant reduction in message size. Because there are many SIP data structures which have specific formats and specific layouts, this type of token assignment is ideal for these headers.

The efficiency of the present invention is illustrated in the following example. The following description uses the example presented at the beginning of this section which is reproduced here for convenience.

INVITE tel:6505557000 SIP/2.0
v: SIP/2.0/UDP
   10.0.0.99;branch=z9hG4bKYwAACk7wKjc4;tok="1/
     com.example/1"
t: <tel:6505557000>
f: <sip:originator@example.com>;tag=3819CF51
CSeq: 4255293 INVITE
i: 0059216C@10.0.0.99
m: <sip:originator@example.com>
c: application/sdp
Proxy-Authorization:digest
username="originator@example.com",
   realm="example.com".nonce="ZeqHk3FpPbz
   0If68UYDa+A==_57541d2",uri="tel:6505557000",
     response="77f7bb755b1
   a73e9b3ac7e21d8d77baa"
v=0
o=CM 1600 0 IN IP4 10.0.0.99
s=Cm
c=IN IP4 10.0.0.99
t=0 0
m=audio 1600 RTP/AVP 0 97
a=rtpmap:97 EVRC Assuming that the standard dictionaries and local dictionaries on both initiating device 102 and receiving device 104 are the same, an example of a message dictionary for this message consists of:

| Str # | String | Bytes |
|---|---|---|
| 0 | 6505557000 | 11 |
| 1 | 10.0.0.99 | 10 |
| 2 | YwAACk7wKjc4 (note, the fixed-format Via header allows the leading "z9hG4bK" to be removed) | 13 |
| 3 | Originator | 8 |
| 4 | 3819CF51 | 9 |
| 5 | 6505557003 | 11 |
| 6 | ZeqHk3FpPbz0If68UYDa+A==_57541d2 | 33 |

Note that in this example, the message dictionary only contains strings that are not found in the standard dictionary or local dictionary of the receiving device. Thus, the receiving device will have all of the information necessary to decode the message. The message dictionary is 95 bytes of strings, plus a 12 byte offset array. The following illustrates the token mapping for each header and strings located in the header.

INVITE tel:6505557000 SIP/2.0
    62=INVITE
    02=no display-name, tel, no port, no params, no tag, 0 user parts
    80=msg string '6505557000'

By way of explanation, token "62" is found in the "fixed-format headers & content" group in Table 5. Thus, in the standard dictionary, the token "62" corresponds to the common fixed header "invite." Token 62 defines that the next byte will be a bitfield (flags) structure describing attributes of the INVITE. The value "02" is the bitfield byte, providing specific information about the INVITE being encoded. One implication of the bitfield encoding "02" is that a single string token will follow, containing a telephone number. The value "80" is a token that means direct access, message dictionary, first string—this corresponds to message string representing the telephone number "6505557000". In this example, the telephone number corresponds to a string. However, in other examples, the telephone number can be represented by a binary structure or another data structure. Using the preceding context of the 62 token and 02 bitfield, the decoder knows exactly where to place the string in the resultant INVITE start-line. The rest of the headers and content are mapped in a similar fashion and will not be explained in detail. Continuing with the above example:

v:         SIP/2.0/UDP        10.0.0.99; branch=z9hG4bKYwAACk7wKjc4;tok="1/example.com/1"
    63=via
    81=msg string '10.0.0.99'
    82=msg string 'YwAACk7wKjc4'
    A0=local string '1/com.example/1'
    t:<tel:6505557000>
    64=to:
    02=no display-name, tel, no port, no params, no tag, 0 user parts
    80=msg string '6505557000'
    f:<sip:originator@example.com>;tag=3819CF51
    65=from:
    30=no display-name, sip, no port, params, tag, 1 user part
    83=msg string 'originator' (implies '@')
    A1=local string 'example.com'
    10=1 extra non-uri parameter
    42=param, ';', not quoted
    85=msg string '6505557003'
    84=tag string '3819CF51'
    CSeq: 4255293 INVITE
    66=Cseq
    00
    40
    EE
    3D=int32 value
    06=method code for 'INVITE'
    i: 0059216C@10.0.0.99
    67=call-id, handset-style
    00
    59
    21
    6C=handset-style call-id identifier (int32)
    81=msg string '10.0.0.99'
    m: <sip:originator@example.com;tok="1/com.example/1">
    69=m: header fixed-format start
    50=no display-name, sip:, no port, 1 param, no tag, 1 user part
    83=msg string 'originator'
    A8=local string 'example.com'
    01=1 uri-param
    42=param, semicolon, quoted
    B0=local string 'tok'
    A0=local string '1/com.example/1'
    c: application/sdp This header is skipped (see content token below)
    Proxy-Authorization: digest username="originator@exampledomain.com", realm="example.com",nonce="ZeqHk3FpPbz0If68UYDa+A=__57541d2",uri="tel:6505557000", response="77f7bb755b1a73e9b3 ac7e21d8d77baa"
    6B=proxy-authorization digest
    85=msg string 'originator'
    A8=local string 'example.com' (implies '@')
    02=local string 'example.com'
    86=msg string 'ZeqHk3FpPbz0If68UYDa+A=__57541d2'
    <16 bytes>=MD5 response hash
    v=0
    o=CM 1600 0 IN IP4 10.0.0.99
    s=CM
    c=IN IP4 10.0.0.99
    t=0 0
    m=audio 1600 RTP/AVP 0 97
    a=rtpmap:97 EVRC
    70=content type=application/sdp
    C2=v=0, os !=0, ov=0, times=0, mports=0, mfmt !=0, attrs
    A9=local string 'CM'
    00
    00
    06
    40=origin session ID
    81=origin ip addr: msg string '10.0.0.99'
    A9=session name: local string 'CM'
    81=connection ip addr: msg string '10.0.0.99'
    A5=media name: local string 'audio'
    06
    40=media port#
    A5=media transport: local string 'RTP/AVP'
    B1=media formats: local string '0 97'
    01=1 attributes line
    AD=attribute 1 name string: local string 'rtpmap'
    AE=attribute 1 value string: local string '97 EVRC' (implies ':')

Figure 5:
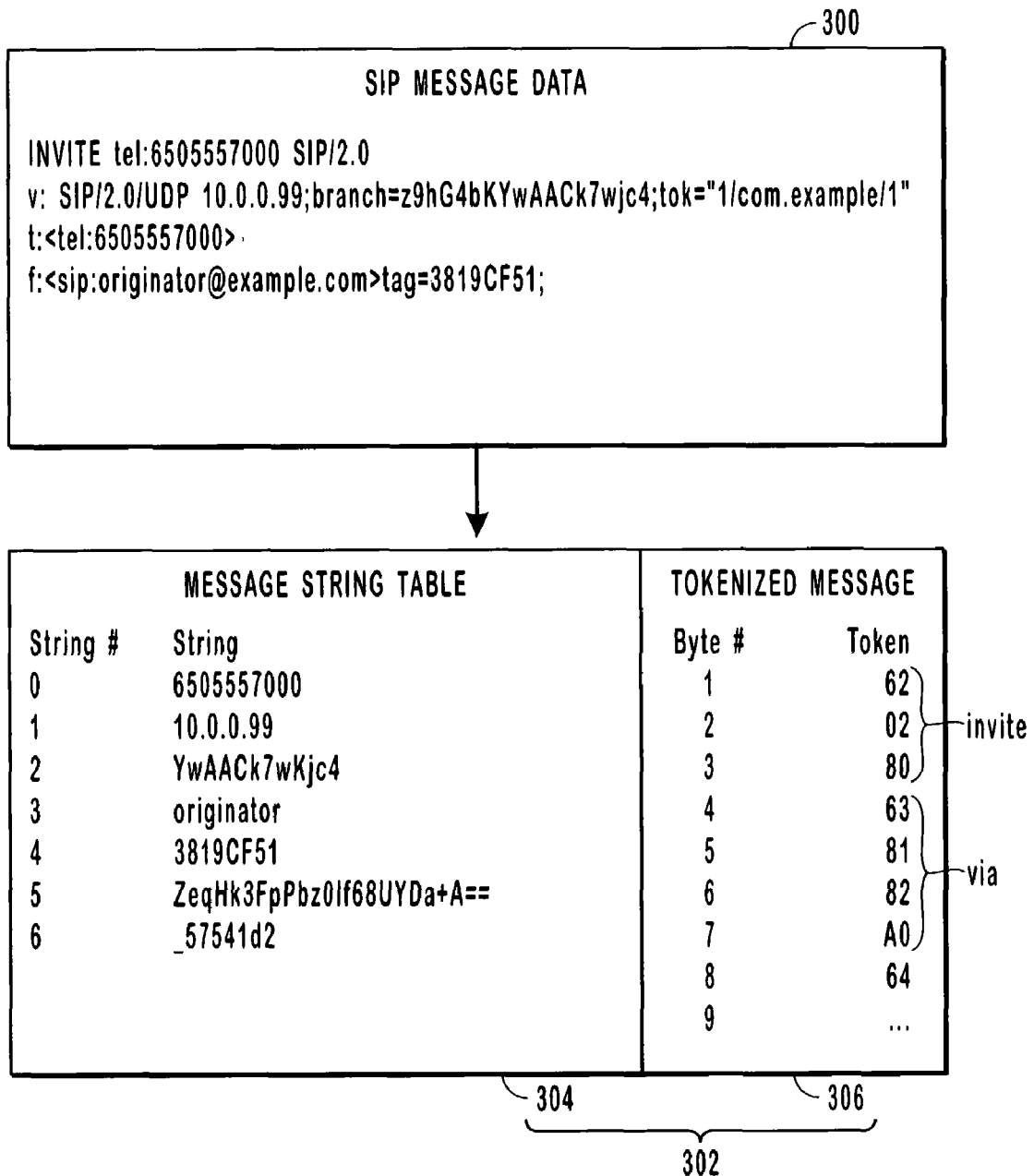
FIG. 5 illustrates a block diagram of the token mapping from text to compressed binary code.

Thus, in the foregoing example, the resulting compressed message 302 may lock similar to the block diagram of FIG. 5. As shown in FIG. 5, the original SIP message data 300 is converted to compressed message 302. That is, message 302 would include a message dictionary 304 which lists the tokens and their corresponding strings, and then the tokenized message 306 which contains the SIP message in tokenized form.

For incoming tokenized messages, tokenized parser 206 decodes tokenized message 216 using the message dictionary 222 accompanying the tokenized message. Tokenized parser 206 will also use standard dictionary 218 and local dictionary 220 to assist in decoding the tokenized message. The tokenized message 216 contains the message dictionary, and a stream of tokens used to describe the message itself.

Decoding or decompressing the tokenized message simply reverse the steps of compressions discussed above. Note that because the present invention is intended to preserve semantic equivalents rather than exact character-for-character equivalence, the translation from tokenized binary form back to text form may not be exactly the same as the original SIP message. For example, the headers "To:" and "t:" will be encoded with the same token. If translated back to text form, they may both be translated to read "t:". This alteration is insignificant because the semantic meaning of the header remains the same.

The tokenized compression system and methods of the present invention are designed to be non-CPU-intensive, and thus to use relatively littler power, such as battery power, to compress and decompress a SIP message, compared to the power consumption associated with SigComp compression and decompression. This makes the present invention well-suited for use on battery-operated devices. In addition, the compressed messages resulting from the present invention require very little bandwidth, making them ideal for reducing call-setup latencies on narrow band links, such as those used in mobile telephone networks. Furthermore, the compression mechanisms of the present invention are stateless. Thus, ongoing compression and decompression can be successfully performed even if some data loss has been experienced when sending previous messages.

4. Tokenized SIP and Network Information Gathering Devices.

Figure 6:
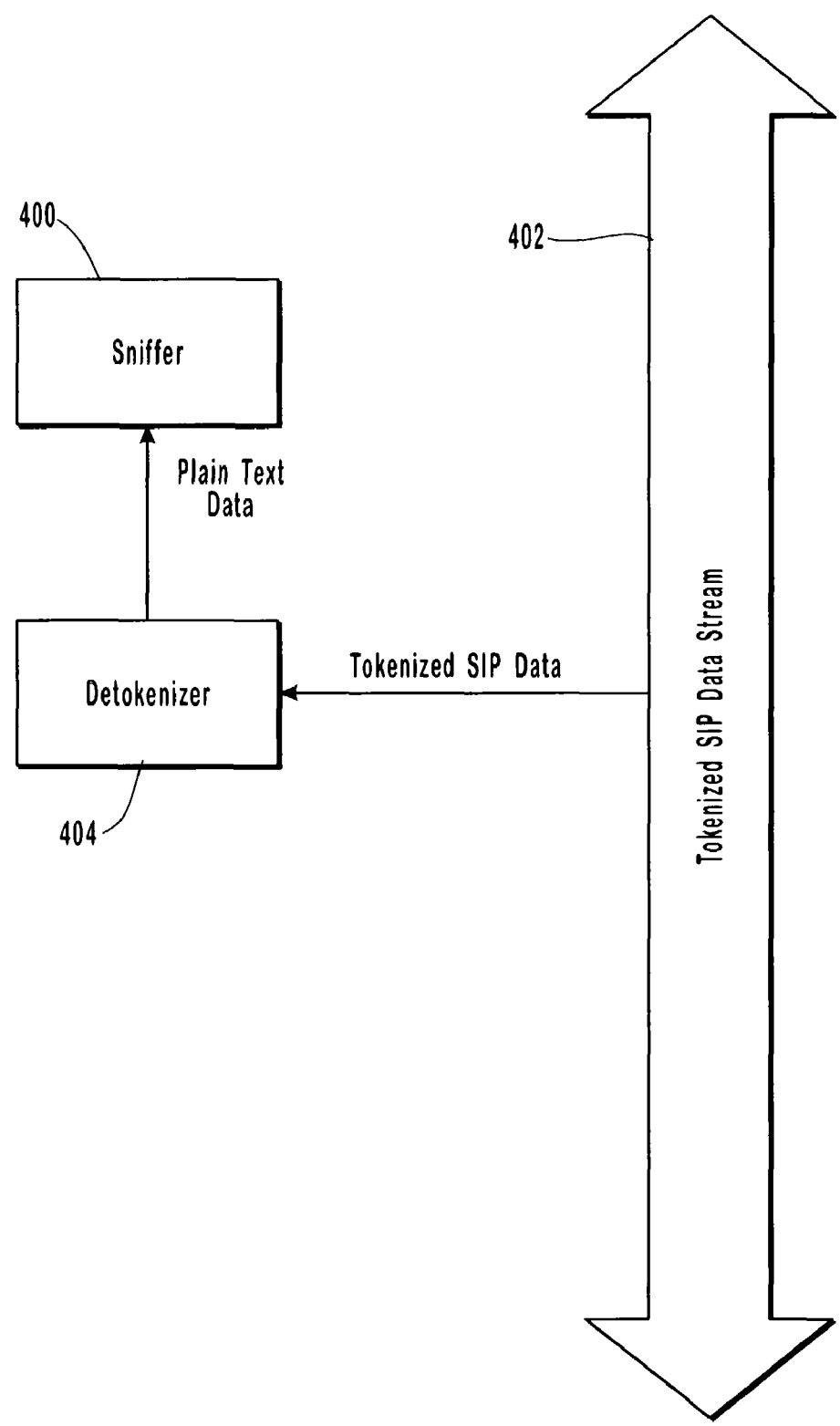
FIG. 6 illustrates the use of tokenized SIP and a tokenized SIP-to-plaintext module to enable an existing plaintext-SIP network analyzer to access the SIP data stream.

FIG. 6 illustrates another application of the SIP tokenization methods of the invention. In FIG. 6, a sniffer 400, which is a network information gathering device such as a network analyzer, or a packet sniffer, and which may include debugging tools, is used to access the SIP data stream 402 to capture and analyze SIP data. Sniffer 400 is useful for troubleshooting and for obtaining quality of service metrics in networks that can have an arbitrary number of devices and servers. Conventional sniffers 400 process plaintext data, which is the format in which SIP data is transmitted in the absence of compression. When SigComp compression is used, sniffers 400 cannot easily analyze the SIP data stream, because the data is compressed, and decompression thereof requires a synchronized database for each wireless station or other communication device that is being monitored.

In contrast, tokenized SIP data can be conveniently monitored by sniffer 400 using a detokenizer 404 that converts tokenized SIP data to plaintext formatted SIP data. The detokenizer 404 can be similar to the detokenizer 242 of FIG. 4. The detokenizer supplies plaintext SIP data to sniffer 400. From the standpoint of sniffer 400, which can be a conventional network analyzer, the plaintext data received from detokenizer 404 is processed in a manner similar to that performed by sniffers that monitor networks transmitting plaintext SIP data streams that have not been compressed in any way.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a communication device that uses session initation protocol (SIP) to transmit data used to set up communication with another device, a method of compressing the data, comprising:
    at a serializer in the communication device, receiving a SIP data structure that represents a SIP message;
    generating a compressed message that includes a message dictionary and a tokenized message having a list of tokens representing semantic elements of the SIP data structure, wherein the tokens include both first tokens assigned from a standard dictionary stored on the communication device and second tokens assigned to access the message dictionary included in the tokenized message; and
    transmitting the compressed message from the communication device to the other device.

2. The method as recited in claim 1, wherein generating the compressed message is performed without generating a plaintext message that represents the SIP message.

3. The method as recited in claim 1, wherein at least some of the tokens included in the tokenized message are selected based on knowledge of the semantic meaning of the SIP data structure.

4. The method as recited in claim 1, wherein generating the compressed message is performed in a stateless manner that does not require knowledge of any previous SIP messages that have been generated by the communication device.

5. The method as recited in claim 1, wherein at least some of the tokens included in the tokenized message represent semantic elements that are common to substantially any legal SIP message.

6. The method as recited in claim 5, wherein other tokens included in the tokenized message are selected to represent at least one of a telephone number and an IP address.

7. The method as recited in claim 5, wherein other tokens included in the tokenized message are selected to represent strings in the SIP data structure.

8. The method as recited in claim 5, wherein generating the tokenized message is performed using at least one static dictionary located at the communication device, the at least one static dictionary including the standard dictionary and/or a local dictionary, wherein the standard dictionary comprises text strings common to any SIP implementation and the local dictionary comprises strings that are not included in the standard dictionary and are specific to a particular domain.

9. The method as recited in claim 8, wherein:
    generating the compressed message is further performed using the dynamic message dictionary that includes strings identified in the SIP data structure; and
    the method further comprises transmitting the dynamic message dictionary with the tokenized message from the communication device to the other device.

10. The method as recited in claim 1, wherein generating the compressed message is performed using a tokenized SIP serializer that also serializes the data for transmission to the other device.

11. The method as recited in claim 1, wherein:
    the serializer is a conventional SIP serializer that generates a plaintext message representing the SIP message; and
    generating the tokenized message is performed using a tokenizer that operates with the conventional SIP serializer and generates the tokenized message from the plaintext message.

12. The method as recited in claim 1, wherein transmitting the compressed message is performed such that the other device can decode the compressed message to obtain the SIP message, thereby enabling a communication session to be established between the communication device and the other device.

13. In a communication device that uses a session initation protocol (SIP) to receive data used to set up communication with another device, a method of decompressing the data, comprising:
at the communication device, receiving a compressed message that includes a message dictionary and a tokenized message having first tokens and second tokens representing semantic elements of a SIP data structure generated by the other device, wherein the SIP data structure generated by the other device represents a SIP message;
decoding the tokenized message by identifying the semantic elements represented by the tokenized message, wherein the first tokens are used to access a standard dictionary stored at the communication device and second tokens are used to access the message dictionary in order to obtain, a decoded SIP data structure; and
using the decoded SIP data structure to establish or continue a communication session between the communication device and the other device.

14. The method as recited in claim 13, wherein the compressed message is received by a tokenized parser of the communication device.

15. The method as recited in claim 14, wherein decoding the tokenized message included in the compressed message is performed without generating a plaintext message that represents the SIP message.

16. The method as recited in claim 13, decoding the tokenized message comprises identifying semantic elements that correspond to tokens of the tokenized message using knowledge of the semantic meaning of SIP data structures.

17. The method as recited in claim 13, wherein decoding the tokenized message is performed in a stateless manner that does not required knowledge of any previous SIP messages that have been generated by the other device.

18. The method as recited in claim 13, wherein at least some of the tokens included in the tokenized message represent semantic elements that are common to substantially any legal SIP message.

19. The method as recited in claim 18, wherein one or more of the tokens included in the tokenized message are selected to represent at least one of a telephone number and an IP address.

20. The method as recited in claim 18, wherein other tokens included in the tokenized message represent strings in the SIP message.

21. The method as recited in claim 18, wherein decoding the tokenized message is performed using at least one static dictionary located at the communication device, the at least one static dictionary including the standard dictionary and a local dictionary, wherein the standard dictionary comprises text strings common to any SIP implementation and the local dictionary comprises strings that are not included in the standard dictionary and are specific to a particular domain.

22. The method as recited in claim 21, wherein:
decoding the tokenized message is further performed using the dynamic message dictionary that includes strings identified in the SIP message; and
the method further comprises receiving the dynamic message dictionary from the other device with the tokenized message.

23. The method as recited in claim 13, wherein decoding the tokenized message is performed using a tokenized SIP parser that also parses the SIP message.

24. The method as recited in claim 13, wherein decoding the tokenized message comprises:
using a detokenizer that receives the tokenized message and generates a plaintext message representing the SIP message; and
using a conventional SIP parser to parse the plaintext message to obtain the SIP data structure.

25. A communication device for handling session initation protocol (SIP) transactions in a network, including generating SIP data structures, the communication device comprising:
an application that generates SIP data structures;
a tokenized serializer in the communication device configured to receive SIP data structures that represent outgoing SIP messages and to generate outgoing compressed messages that include tokenized messages including lists of tokens representing semantic elements of the SIP data structures, wherein the outgoing compressed messages comprise a message dictionary generated by the communication device, wherein the tokens include first tokens and second tokens; and
a tokenized parser configured to receive incoming compressed messages that includes the tokenized messages including the lists of tokens representing semantic elements of SIP data structures generated by another device and to decode the incoming tokenized messages by identifying the semantic elements represented by the tokenized message, wherein the device uses the second tokens to access the message dictionary and the first tokens to access a standard dictionary of the device to decode the incoming tokenized messages.

26. The communication device of claim 25, wherein the tokenized serializer operates without generating plaintext messages that represent the outgoing SIP messages.

27. The communication device of claim 25, wherein the tokenized parser generates decoded SIP data structures without generating plaintext messages representing the incoming SIP messages.

\* \* \* \* \*